US006898307B1

(12) United States Patent
Harrington

(10) Patent No.: US 6,898,307 B1
(45) Date of Patent: May 24, 2005

(54) OBJECT IDENTIFICATION METHOD AND SYSTEM FOR AN AUGMENTED-REALITY DISPLAY

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/400,755

(22) Filed: Sep. 22, 1999

(51) Int. Cl.[7] .............................. G06K 9/00; G06K 9/46; G09G 5/00
(52) U.S. Cl. ........................ 382/154; 382/203; 345/633
(58) Field of Search ................................. 382/190, 203, 382/218, 219, 286, 288, 291, 106, 154; 348/14.16, 42, 47; 345/7, 619, 629, 633

(56) References Cited

U.S. PATENT DOCUMENTS

| 6,064,749 | A | * | 5/2000 | Hirota et al. ................... 345/7 |
| 6,266,057 | B1 | * | 7/2001 | Kuzunuki et al. ........... 345/156 |
| 6,278,479 | B1 | * | 8/2001 | Wilson et al. ................. 348/47 |
| 6,317,127 | B1 | * | 11/2001 | Daily et al. .................. 345/629 |
| 6,408,257 | B1 | * | 6/2002 | Harrington et al. ...... 348/14.16 |

OTHER PUBLICATIONS

Wellner, P., "Interacting Paper on the Digital Disk," Comm. on ACM, V. 36, N. 7, Jul. 1993, pp. 87–96.*
Mackay, W. et al, "Augmenting Reality Adding Computation P Dimension to Paper," Comm. on ACM V. 38, N. 7, Jul. 1993, pp. 96–97.*
Wellner, P., "The Digital Desk Calculator. Tangible Manipulation on a Desk Top Display", Proceedings of UIST'91, ACM, Nov. 1991, pp. 27–33.*

Billinghurst, Mark; Weghorst, Suzane and Furness, Tom III, "Wearable Computers for Three Dimensional CSCW", International Symposium on Wearable Computers, Oct. 13–14, 1997, Cambridge, MA.

Fitzmaurice, George W. and Buxton, William, "An Empirical Evaluation of Graspable User Interfaces: towards specialized, space–multiplexed input", Proceedings of CHI '97 Conference on Human Factors in Computing Systems, pp. 43–50.

Fitzmaurice, George W., Ishii, Hiroshi and Buxton, William, "Bricks: Laying the Foundations for Graspable User Interfaces", Proceedings of Human Factors in Computing Systems, CHI '95, pp. 432–449.

Robinson, Peter; Sheppard, Dan; Watts, Richard; Harding, Robert and Lay, Steve, "A framework for interacting with paper", The Eurographics Association 1997, Published by Blackwell Publishers, Malden, MA 02148, USA., vol. 16, (1997), No. 3, pp. C–329–C–334.

* cited by examiner

Primary Examiner—Mehrdad Dastouri
(74) Attorney, Agent, or Firm—Fay, Sharpe, Fagan, Minnich & McKee, LLP

(57) ABSTRACT

A method and apparatus selectively displays a processor generated image in accordance with user instructions detected by a processor from a processor viewing device disposed to view a real reference item controlled by the user. The real item, preferably a page of paper, is disposed as a reference frame for an electronic image to be displayed. The orientation of the page is identified by the system. Corresponding real world coordinates are computed for the captured image and compared with predetermined standards to verify the nature of the object.

10 Claims, 3 Drawing Sheets

OBJECT IDENTIFICATION METHOD AND SYSTEM FOR AN AUGMENTED-REALITY DISPLAY

BACKGROUND OF THE INVENTION

This invention relates generally to a method and apparatus for viewing and interacting with a real world item such as a page, with a virtual display of imagery and/or text to give the illusion of holding a printed version of an electronic document without actually printing the displayed document. In augmented-reality, some form of physical display such as glasses, goggles or a helmet-mounted display is used to project or superimpose a computer-generated image onto the user's view of the real world. The system analyzes the viewer's image in real-time and adjusts the computer-generated image to correspond with the actual view. Such interaction combines some of the feel and function of a real item such as paper (holding it, writing on it) with the capabilities of an electronic document (dynamic, interactive). However, it would be appreciated to those of ordinary skills in the art that the invention could be readily adapted for use in other environments as, for example, where similar imaging methods are advantageously associated with other reality items for other purposes than displaying a document.

The ubiquitous use of PC workstations and the capabilities of the World Wide Web are leading to the use of electronic documents and the inclusion of dynamic components such as hyperlinks and video. These electronic documents are often not compatible with the static requirements of paper prints. Yet people still prefer paper for reading long documents, and paper is easily annotated and portable. There is a need for a display mechanism that combines the desirable properties of static paper and the dynamic capabilities of a CRT or LCD display. Research towards that goal includes work on Portable Document Readers and Electric Paper. This invention relates to an alternative approach based on the idea of augmented-reality.

In augmented-reality, a video camera can be used to provide the computer with the same view as seen by a user, then a computer-generated image is superimposed on that view. This is not virtual-reality where the user is immersed in a totally synthetic, computer-generated environment. Rather, augmented-reality is a combination of the synthetic computer-generated image superimposed upon an every day object of the real world.

Although augmented-reality display systems are known, they have had limited applications and usefulness. In particular, the reality portion identified by the video camera has largely been limited to a fixed view of a single setting, which is predetermined and strictly limited as to what may be presented and identifiable from the camera image. In addition, what can then be displayed on this controlled setting is also undesirably limited as to what can be shown, usually just a single image. Interaction with the display is essentially unknown.

As people become more accustomed to electronic, multimedia publishing as an alternative to conventional publishing on paper, there is a substantial need for more convenient and improved interactive control to enhance the freedom, variety and quality of display imagery in a user environment that is comfortable, convenient and easily controllable with regard to the viewing of an electronic display. Prior known application programs for electronic publishing are incompatible with augmented-reality display systems. Such programs are more accustomed to instruction processing comprising mouse, keyboard or button press representations for user instructions. There is a particular need for an application program that can recognize and translate convenient user commands in an augmented-reality setting, i.e., paper manipulation, hand and finger gestures, selected voice commands, in a real-time processing setting, for the improved interactive display scheme envisioned above.

Another particular problem needed to be solved with regard to augmented-reality display systems is a dependable system for recognizing certain preselected objects within the view plane of the image. For example, if the user intends to utilize a piece of paper as a reference plane for the augmenting display, distinguishing the piece of paper from other objects in the image having common characteristics to the paper is a certain problem. If the view plane could be controlled to provide a distinguishable background behind a single piece of paper, the distinguishing problem is simplified. However, if the background is a compilation of different items, such as commonly occur on a desk or work surface, i.e., desk pad, envelopes, file folders, coffee cups, or even a shirt sleeve cuff of a user, all of which can appear in the viewing plane as having straight edges and corners, then the real world concern of identifying a particular piece of paper can be readily appreciated. The problem more specifically involves converting images having two-dimensional characteristics common with a paper page as seen in a view plane to a corresponding three-dimensional object, and then verifying whether that object is reasonably consistent with a piece of paper.

The present invention contemplates coordinating a synthetic image with a real one with particular application to the display of documents comprising text and images so that the real image can be a piece or plurality of pieces of paper that the user can access. The user can manipulate electronic documents augmented with the pieces of paper, in a manner to organize them by the natural mechanism of selective positioning and movement of the pieces of paper. A scaling of the image is controlled by positioning of the paper relative to the eyes of the user so that the user is not confined to the limited screen space of a CRT or LCD display, but can have many documents available (analogous to a multi-window electronic display) by just turning the head from one piece of paper to another. Movement between different documents or images is easily realized by accessing of displayed hyperlinks. Such a system is readily adaptable to a plurality of uses with reality references of a variety of dimensions and characteristics, and which provides improved communicative and interactive capabilities between a user and a computer display system with a selective variety of interactive tools that are comfortable and convenient for the user.

The present invention further contemplates verifying the presence of a preselected object intended for use as a reference tool by a user such as a standard piece of paper, so that the reference tool is readily distinguishable from the plurality of real world items that are commonplace in a work setting.

A BRIEF SUMMARY OF THE INVENTION

In accordance with the present invention, there is provided a method and apparatus for displaying an electronically generated image and/or text in association with a real world reference item for an augmented-reality type of display. A real item such as a simple blank piece of paper or reference screen is disposed within a field of view and control of a user so that manipulation of the real item is intended to be communicative of user instructions. This item is selectively positionable by the user for purposes of communicating certain instructions to an applications program controlling the display. Other instructions can be captured by the application program through hand or tool gestures or voice commands. A sensing device such as a video camera identifies the existence and disposition of the real item. A display device, such as a headset, goggles or glasses displays the images as a virtual display overlay upon the real item. The image is displayed in accordance with the selective positioning of the item by the user. If the item comprises a piece of paper, movement of the paper towards the user will effectively enlarge the display.

In accordance with another aspect of the present invention, a method is provided for verifying whether a projected image within a view plane of the display system corresponds with a preselected object, such as a piece of paper, whereby the object may be employed as an interface tool for the system. The method comprises unprojecting the candidate object into three-dimensional coordinates using known features of the display system. The three-dimensional version is then tested for verification of expected object properties such as right angle corners, reasonable positioning and a planer structure. The method comprises first identifying a representative characteristic of the candidate object within the view plane such as a right angle corner. The dimensional aspects of the object are then determined from the projected image such as the length and diagonals between corners and center points on the diagonal. A corresponding three-dimensional identity and location relative to the view plane is then computed for the object. The resulting coordinates are then compared with predetermined standards like standard paper dimensions for verifying whether the dimensional identity and location are reasonably consistent with a real piece of paper.

An important benefit obtained by the present invention is an augmented-reality display system which is interactive with the user to allow manipulation of the image in accordance with user instructions.

Other benefits and advantages of the subject augmented-reality display method and system will become apparent to those skilled in the art upon a reading an understanding of this specification.

BRIEF DESCRIPTION OF THE DRAWINGS

The invention may take physical form in certain parts and steps and arrangements of parts and steps, the preferred and alternative embodiments which will be described in detail in the specification and illustrated in the accompanying drawings which form a part hereof and wherein.

DETAILED DESCRIPTION OF THE INVENTION

Figure 1:
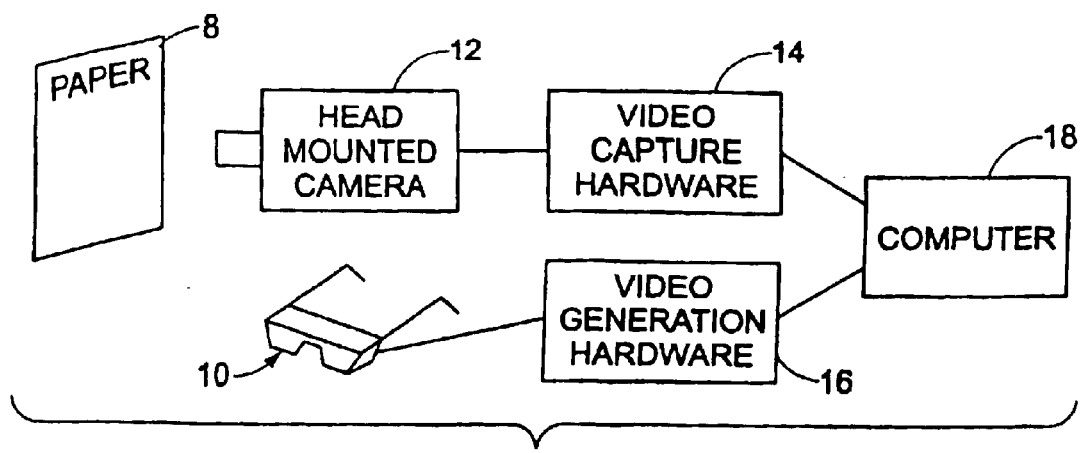
FIG. 1 comprises a simplified block diagram of the basic structural elements of the invention.

Referring now to the drawings wherein the showings are for the purposes of illustrating the preferred and alternative embodiments of the invention only and not for purposes of limiting the invention, the FIGURES show an augmented-reality display system wherein the images are made adjustable through interaction of the user with the image itself.

More specifically, with reference to FIG. 1, the augmenting image is perceived by the user through or in a set of glasses or goggles 10 which is intended to comprise any type of headset through or in which an electronic image can be displayed to the wearer. A sensing device such as a video camera 12 captures the normal field of view of the user of the headset 10 and thus should be small enough so that it can be preferably mounted on the headset in a manner to give the user the comfortable impression that the image he perceives is substantially similar to the one he would see when not wearing the headset 10. There are many head-mounted displays commercially available. Some are completely immersive in that they completely block out the real world. Others, known as "heads-up" displays superimpose the electronic display over a view of the real world. Although either type of display system is within the scope of the invention. It is merely important that the camera 12 provide the computer 18 with the same view that the user sees so that the synthetic image is displayed in a manner for comfortable and convenient interaction between the real reference item, i.e., a piece of paper, within the field of view that the user may be holding and manipulating.

The video capture hardware 14 comprises a circuit that can convert the analog signal from the camera 12 into a digitized frame that can be stored in the computer 18 for analysis as will be discussed more fully below. Essentially, the hardware 12 outputs a signal to the computer as a digitized and processible representation of what the user sees from the camera's field of view. The video generation hardware 16 takes a bit map of pixel values from the computer 18 and converts them into a television format that can be displayed on the headset 10. The signal generated by the camera 12 is different from the signal displayed on the headset 10 by the addition of the computer-generated electronic image to thereby form a synthetic image as an augmented-reality display.

Figure 2:
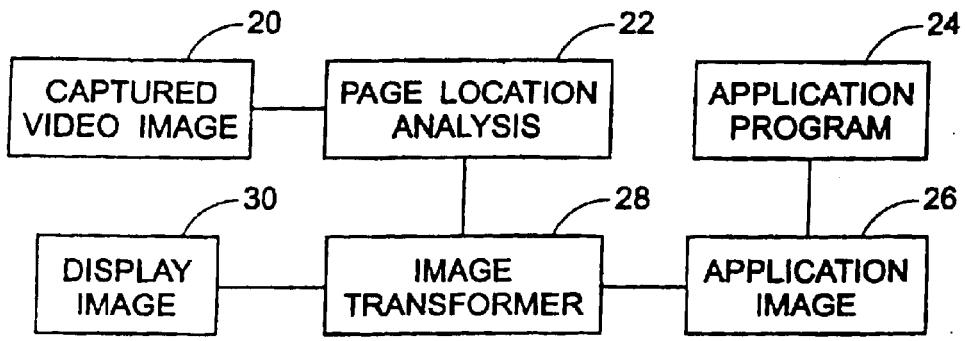
FIG. 2 is a block diagram of the operational modules for implementing the invention.

With reference to FIG. 2, certain software functions of the hardware are shown. The computer 18 must interpret the captured video frames to locate a piece of paper within the camera view. Although the application preferably discloses paper as the real item to be sensed by the camera, it is within the scope of the invention to employ other convenient reference items, such as a screen or reference template, for example where the synthetic image comprises a moving illustration or three-dimensional objects such as may be generated by design or operational test programs.

FIG. 2 details the functions regarding the analysis and image preparation processes of the computer 18. The overall objective of the captured information processing is to interpret the video frames for locating pieces of paper within the view of the camera. Additionally, the computer-generated image is transformed and distorted such that when its image is presented in the head-mounted display 10 it overlays the paper as seen by the user. The digitized captured video frames 20 are analyzed by page location analysis module 22 to locate the position of one or more pieces of paper within the view of the camera 12. A piece of paper can be identified by its white color against a darker background. To identify the existence of a page within a captured video image, the analyzer 22 can examine sample pixels within the image to see if any are white. Once a white pixel (indicating the presence of a page) is found, the position of the page can be determined using well-known edge finding techniques. For example, starting with the known white pixel one can step through the pixels (up, down, right or left) examining each until a non-white value is found, indicating the edge of the page. Another approach to finding a corner position of a page is to step through the white points in the page in a direction diagonal to the sides until two edge points are found.

Figure 5:
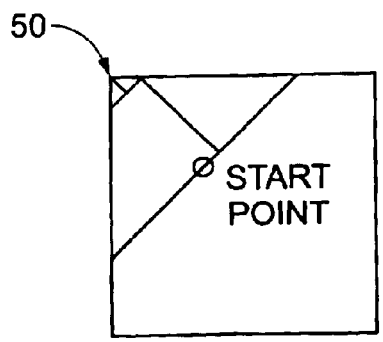
FIG. 5 is a schematic diagram to illustrate one scheme for identifying a piece of paper within a camera viewing area.

Note in FIG. 5, the midpoint of the line between the edge points is used as a starting point for a search perpendicular to the original diagonal. The edge point found by this latest search is used as a starting pointing for repeating the process until a corner 50 is reached and the two edge points meet. This approach can be used when the straight edge of the paper is partially hidden (as by the hand holding the page). The former approach can be used when the corner is hidden. Both of the foregoing edge-finding techniques are well-known in the art. The application program module generates any image that could be selected by a user as an electronic image on a CRT or LCD. The application image 26 is thus equivalent to opening up a window on a screen. For example, the user could select as the application image 26 a particular internet browser engine which, based upon the located orientation of the piece of paper, would be transformed 28 to exactly match the detected orientation of the piece of paper so that the displayed image 30 provides the illusion of the web page actually appearing on the blank piece of paper being held by the user. In other words, once the position of the paper page (e.g., the position of its corners) is determined, this information can be used to correctly distort the application's image so it overlays the paper in the eyes of the user. This is a well-known problem in computer graphics of mapping a textual (the application image) onto a projected image. The translation, rotation, scaling and perspective operations can be applied to the image using standard image processing methods, or specialized textual mapping hardware may be employed for improved processing speed. The information analysis and image preparation need be accomplished in essentially real-time for the image display to appear as real as possible to the user.

Figure 3:
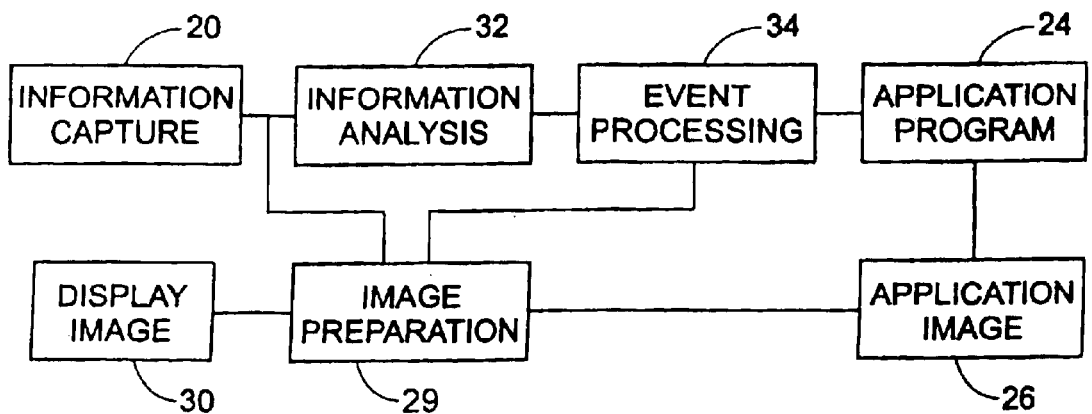
FIG. 3 is a block diagram of the operational modules of an alternative embodiment of the invention.

With particular reference to FIG. 3, an alternative system architecture is shown that provides enhanced interaction for typical user applications. In particular, the page location analysis module of FIG. 2 has been expanded to comprise an information analysis module 32 and event processing module 34.

Figure 4:
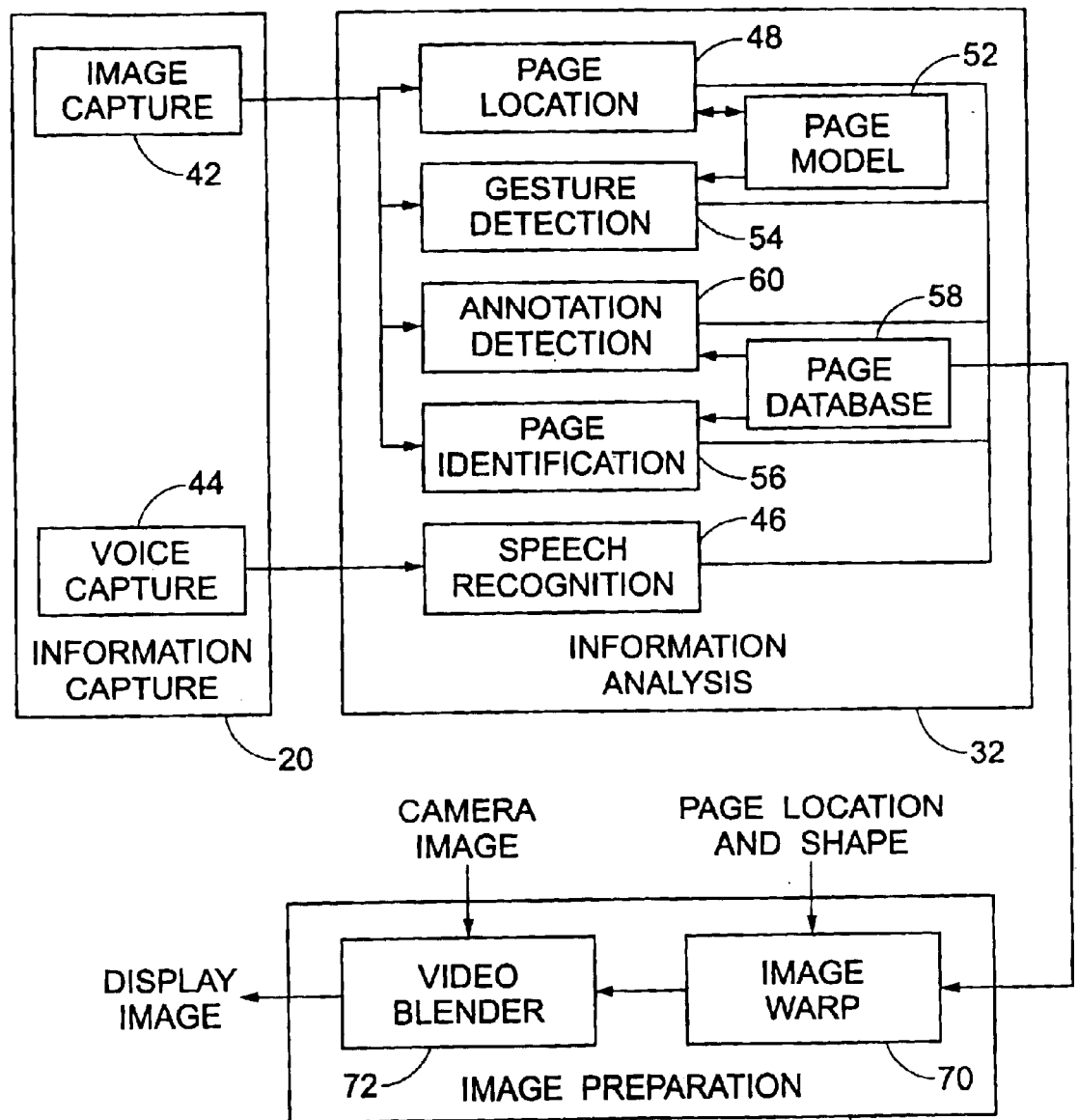
FIG. 4 is an embellished operational flow diagram of certain of the modules of FIG. 3.

With reference to the operational flow diagram of FIG. 4, information capture module 20 is enhanced not only for video image capture 42 but also voice commands 44 so that the user can communicate and manipulate the application image by both image and speech.

The information analysis module is correspondingly enhanced for speech recognition 46, and image analysis. The page locating process 48 may refer to a model of the page 52 that could, for example, give the last known location and orientation of the page, and also predict the page location for the current frame. The gesture detection module 54 identifies hand, finger or tool gestures selected and identifiable as a user command to the computer 18. For example, again assuming the image is an internet browser, and analogizing the operation to a screen wherein interaction occurs with a mouse pointer and button press, the finger of the user could accomplish the exact same function as the mouse pointer and speech recognition of a command such as "select" will accomplish the functions of the button press. Thus, a combination of a certain gesture and speech will allow the user to execute a hyperlink to another website. In addition, the model 52 of the current page may also provide useful information to the gesture detection module, for example, the pointing gesture can be expressed in terms of a location on the page. For page identification 56 a data base of possible matching pages might be needed. Comparing a reference page from a data base 58 of possible matching pages might be needed. Comparing a reference page from the data base 58 to the current page identification 56 can also provide a way to detect 60 if annotations have been added to the page. Certainly, additional input capture, additional analyses and additional supporting information are possible. The example modules given are meant to be illustrative of one particular system architecture. The outputs of the information analysis module 32 are events, such as a change in the page position, and the information associated with the event, such as the new page location. Other events such as a change in a gesture, the identification of a page, or the entry of a command are also examples of events. These events and their associated data are given to the event processing module 34. The job of the event processing module 34 is to convert the events and data from the information analysis module 32 to events suitable to the applications, and also to provide the analysis data needed to construct the display image. Most application programs 24 are typically designed with the expectation of a keyboard and mouse as the interface mechanism. In the augmented-reality system of the subject invention, these devices are replaced with gestures, movements of the paper and voice commands. The event processing module must translate the gestures, movements and commands into the corresponding keyboard and mouse events or event sequences that the application program understands. For applications running under a windows system, the translated commands can be generated through the windowing system so that no changes to the applications are needed for input.

The windowing system can provide for the application image 26 to be generated in a virtual frame buffer. This image would not actually be displayed, but would be available for further processing by the image processing module 28. This approach allows the applications to be run without modifying the application program module 24. For example, a mere turning of the page in a horizontal direction can be interpreted as a gesture command to go to a next page of a textual document. Accordingly, this gesture must be translated into the same signal that the application program would receive from a button press on a next page icon for a textual document display. Similarly, flipping the page in a vertical direction can be interpreted as a command to scroll the document. The event processing module 34 thus provides a simple way for the subject system to encompass a large body of existing application programs.

The image preparation module 28 has two major functions. The first is to warp the application image into the location and shape that matches the page being viewed by the user. The second is to merge 72 the camera image and the warped application image to create the augmented image that will be displayed to the user. The image preparation occurs in real-time to provide a reasonable display image. For this reason, the image preparation may make use of special hardware in order to accomplish the warping and blending processings in minimal time.

This architecture could be generalized to support multiple applications. Each application would write its image in its own virtual frame buffer and each would be warped to match a distinct page for a plurality of papers identified in the viewing area. Warped images can be combined into a single overlay for blending with the camera image to form the displayed image.

Figure 6:
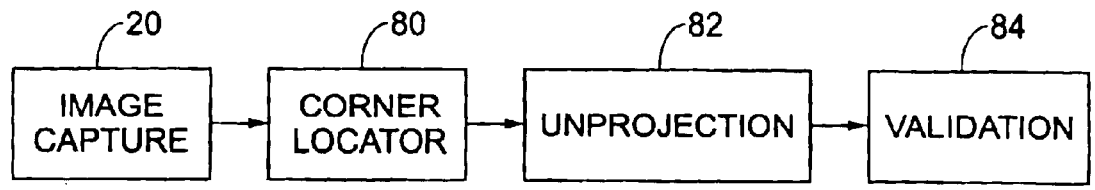
FIG. 6 is a block diagram of the operational modules of the system for verifying the presence of preselected objects such as a standard piece of paper within the view frame.

With particular reference to FIG. 6, a method and apparatus is disclosed for verifying the presence of a preselected reference item from a candidate object within the view plane. The preselected object preferably comprises an item that may be utilized by a user as an interface tool in the augmented-reality display system and can comprise such items as a reference panel, screen or tablet, but for purposes of the remaining portions of this specification, will be described as an ordinary sized piece of paper. The subject invention provides a method and apparatus to verify the presence of the standard piece of paper in the captured image received upon the view plane of the camera. The method will involve unprojecting the candidate object into three-dimensional coordinates using knowledge of the camera properties. The three-dimensional coordinate version can then be tested for characteristic properties consistent with the standard piece of paper such as right angle corners, reasonable positioning, planar structure and standard paper dimensions.

Corner location 80 is implemented in a manner as disclosed with reference to FIG. 5 and since all standard pieces of paper must have corners, the identification of a corner within the view plane effectively identifies a representative characteristic of a candidate object ultimately verifiable as the standard piece of paper.

The location of the page within the captured image is first described by the coordinates of its four corners. However, for the system to be more robust, it needs to be verified that the corners found really do belong to a piece of paper and not to some other object within the scene such as the cuff of the user's shirt sleeve. One verification test is determining if the object has the expected size and shape of a standard (e.g. letter size) piece of paper as seen from a reasonable viewing distance. But since the true size and shape of the object are unknown, the subject invention can only analyze the perspective projection of the object onto the view plane of the camera.

The unprojection module 82 assumes the following model for the antecedent projection: the captured image will appear the same as if drawn on a two-dimensional view plane located a view distance d from a view point. The view point is the position of the user or camera eye receiving the image and the view plane is the position of the flat image in the frame buffer of the camera. The position d between these two points is a known constant of the system. (Note FIG. 7 for diagrammatic definition of component dimensions in this analytic method.) The location of a point in the view plane that corresponds to a point on the object is the intersection of the view plane with the line from the object point to the view point (See Line 86). In other words, by "unprojection" is meant that when a three-dimensional object is projected on to a two-dimensional viewing plane, a two-dimensional image results from the three-dimensional object. Obviously, some data must get lost in this projection step. Additionally, in perspective the image usually also gets warped in some way. The unprojection step comprises the mathematical calculation comprising taking a two-dimensional image and determining what three-dimensional object could have created that two-dimensional image with respect to what the object can be and where it could have been positioned. The subject invention utilizes known dimensions with regard to the camera system and viewing plane, in combination with assumed characteristics of the piece of paper, to complete the unprojection process.

Figure 7:
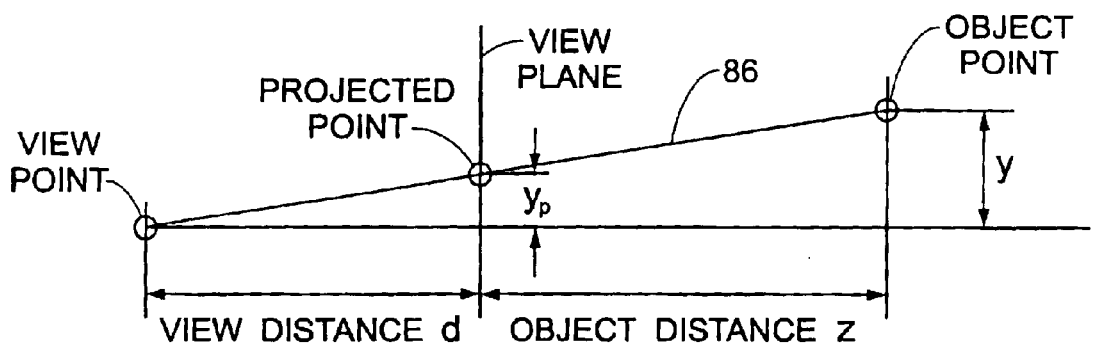
FIG. 7 is a geometric diagram for illustrating the computation steps of the system of FIG. 6.

With the model of FIG. 7 the object point height y is related to the projected point height $y_p$ as $$y = y_p(z+d)/d$$

or $$y = B(z+d) \text{ where } B = y_p/d$$

Similarly the horizontal position of the object x is related to its projected position $x_p$ by $$x = A(z+d) \text{ where } A = x_p/d$$

For a piece of paper, it can be assumed that the center point and two corners of a diagonal are equally spaced. This assumption, along with known system constants and detected object dimensions in the view plane, provides enough information to calculate object coordinates in space.

Figure 8A:
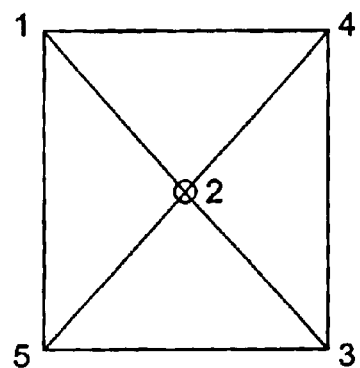
FIGS. 8A and 8B are geometric diagrams for further assisting the explanation of the method steps for the system of FIG. 6.

For the three points on the object equally spaced along a straight line as points 1, 2 and 3 (FIG. 8A), with the distance between points 1 and 3 called D, the Eucledian distance equation gives:

$$D^2 = (x1-x3)^2 + (y1-y3)^2 + (z1-z3)^2$$

Since point 2 is halfway between point 1 and 3, $$x2 = (x1+x3)/2 \; y2 = (y1+y3)/2 \; z2 = (z1+z3)/2$$

and since the points are on a straight line, $$x1-x2 = z2-x3 \text{ and } y1-y2 = y2-y3$$

give $$A1(z1+d) - A2((z1+z3)/2+d) = A2((z1+z3)/2+d) - A3(z3+d)$$

and $$B1(z1+d) - B2((z1+z3)/2+d) = B2((z1+z3)/2+d) - B3(z3+d)$$

Solving these equations for (z1+d) gives $$(z1+d) = g(Z3+d)$$

where $$g = (A3-A2)/(A2-A1) = (B3-B2)/(B2-B1)$$

Using this to remove z1+d from the distance equation, solves for z3+d:

$$z3+d = D/((A3-gA1)^2 + (B3-gB1)^2 + (1-g)2)^{1/2}$$

The foregoing provides the equations for solving for the z-positions of the object points, and from them the x and y coordinates.

Figure 8B:
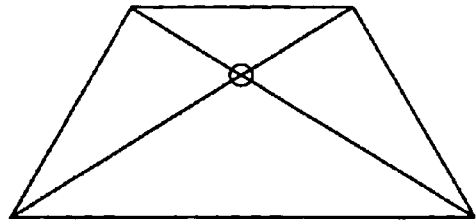

In order to apply this method, an assumption is made that three equally space points comprise a straight line on the object, in this case a piece of paper, and further comprises two opposite corners of the page and the center of the page, that is, points along the page diagonal. These points are chosen because the length of the diagonal is known, and this length is independent of the orientation of the page. (It is not necessary to know whether one is dealing with a long edge or a short edge.) The center point can be found as the intersection of the lines between the opposite corners. This rule holds, even when the page is seen in perspective because the perspective projection preserves straight lines (see FIG. 8B.)

The center of the page is given by $$x2_p = \frac{((y1_p - y5_p)(x3_p - x1_p)(x4_p - x5_p) + x5_p(y4_p - y5_p)(x3_p - x1_p) - x1_p(y3_p - y1_p)(x4_p - x5_p))}{((x3_p - x1_p)(y4_p - y5_p) - (y3_p - y1_p)(x4_p - x5_p))}$$

$$y2_p = \frac{((x5_p - x1_p)(y3_p - y1_p)(y4_p - y5_p) - y5_p(x4_p - x5_p)(y3_p - y1_p) + y1_p(x3_p - x1_p)(y4_p - y5_p))}{((x3_p - x1_p)(y4_p - y5_p) - (y3_p - y1_p)(x4_p - x5_p))}$$

The unprojection method should be applied twice, once for each diagonal. That is, once using points 1, 2 and 3, and again using points 4, 2 and 5. This way the three-dimensional coordinates of all four corner-points can be found.

Once the unprojected object coordinates have been determined, a number of tests are possible for verifying that it is a piece of paper. One can check the lengths of the sides to confirm that they match the expected dimensions of the paper within some tolerance and that as a result they have the expected proportions.

$$\text{Width} = ((x4-x1)^2 + (y4-y1)^2 + (z4-z1)^2)^{\frac{1}{2}}$$
$$= ((x3-x5)^2 + (y3-y5)^2 + (z3-z5)^2)^{\frac{1}{2}}$$
$$\text{Height} = ((x1-x5)^2 + (y1-y5)^2 + (z1-z5)^2)^{\frac{1}{2}}$$
$$= ((x4-x3)^2 + (y4-y3)^2 + (z4-z3)^2)^{\frac{1}{2}}$$

One can check that the corners are right angles. This can be done by checking the dot product of the vectors along the sides which should be zero. The actual dot product should lie within some tolerance.

$$0=(x1-x5)(x1-x4)+(y1-y5)(y1-y4)+(z1-z5)(z1-z4)$$
$$0=(x5-x1)(x5-x3)+(y5-y1)(y5-y3)+(z5-z1)(z5-z3)$$
$$0=(x3-x5)(x3-x4)+(y3-y5)(y3-y4)+(z3-z5)(z3-z4)$$
$$0=(x4-x3)(x4-x1)+(y4-y3)(y4-y1)+(z4-z3)(z4-z1)$$

One can check that the center-point as calculated from the two separate unprojections matches (within some tolerance.)

$$z1+z3=z4+z5$$

One can check to see if the four unprojected corners are planar within some tolerance.

$$0=(x1-x3)((y4-y3)(z5-z3)-(y5-y3)(z4-z3))$$
$$+(y1-y3)((z4-z3)(x5-x3)-(z5-z3)(x4-x3))$$
$$+(z1-z3)((z4-x3)(y5-y3)-(x5-x3)(y4-y3))$$

And one can check that the page lies within the expected viewing range.

$zi>zmin$ $zi<zmax$ where $i=1, 3, 4, 5$ and zmin and zmax are the minimum and maximum acceptable page viewing distances respectively.

The tolerance values depend upon the accuracy and resolution of the image capture equipment and on the particular application. If, for example, it is unlikely that anything other than the page will be within the view, then the tolerances might be rather loose. Tolerances may be set empirically.

The invention describes a method where the three-dimensional world coordinates are calculated in the same units as the two-dimensional captured image coordinates. It is likely that one will be given image coordinates such as pixels and prefer world coordinates such as inches. One therefore needs to apply a simple scaling factor that can be determined empirically for the particular system, along with properties such as the view-distance d.

The invention has been described with reference to preferred and alternative embodiments. Obviously, modifications and alterations will occur to others upon the reading and understanding of this specification. It is my intention to include all such modifications and alterations insofar as they come within the scope of the appended or the equivalents thereof.

Having thus described my invention, I now claim:

1. A method of verifying a projected image within a three-dimensional view plane of an augmented-reality display system as a preselected movable real object disposed in three-dimensional free space, whereby the preselected movable real object may be employed as an interface tool for the system, comprising steps of:

identifying a representative characteristic of the preselected movable real object within the three-dimensional view plane, the preselected movable real object is comprised of three equidistant line points disposed in free space, and wherein the representative characteristic comprises shape and location of the preselected movable real object and is exclusive of preselected marked standards and printed identifiers;

determining dimensional aspects of the preselected movable real object from the projected image including the detection of projected dimensions of the three equidistant line points;

computing a corresponding dimensional identity and location of the preselected movable real object at an object point relative to the view plane including calculating X, Y and Z coordinates in real space of the preselected movable real object at the object point based on the projected dimensions of the three equidistant line points in the view plane and known augmented-reality display system geometric dimensions; and verifying whether the dimensional identity and location are reasonably consistent with predetermined standards for the preselected movable real object.

2. The method as claimed in claim 1 wherein the preselected movable real object comprises a reference panel such as a screen, tablet or piece of paper and the identifying includes recognizing a corner of the panel.

3. The method as claimed in claim 2 wherein the determining comprises calculating distances between corners and a center point of the reference panel.

4. The method as claimed in claim 3 wherein the computing comprises converting the calculated distances to the dimensional identity and location based on an assumption that the reference panel is structurally flat.

5. The method as defined in claim 1 wherein the verifying includes testing from at least one of the tests of (a) whether the preselected movable real object has expected dimensions or proportions, (b) whether the corners are right angles, (c) whether a center point matches when calculated from distinct sets of the corners, (d) whether the corners are generally within a common plane, and (e) whether the preselected movable real object lies within an expected viewing range.

6. A method for identifying a movable real piece of paper disposed in free space in a variable three-dimensional viewing area of an augmented-reality display system comprising steps of:

identifying a movable real object at a viewing plane in the three-dimensional viewing area having a characteristic representative of the piece of paper wherein the characteristic is exclusive of preselected registration marks and printed identifiers;

locating a plurality of corners of the movable real object;

calculating a dimensional representation of the movable real object in the viewing plane from the locations of the corners;

unprojecting the dimensional representation to calculate a plurality of the movable real object coordinates representative of a size of the movable real object and a distance of the movable real object from the viewing plane including calculating X, Y and Z coordinates in real space of the movable real object based on dimensions of the movable real object in the viewing plane and display system geometries; and comparing the movable real object coordinates with predetermined standards indicative of the piece of paper for verifying the object as the piece of paper.

7. The method as defined in claim 6, wherein the calculating includes identifying a diagonal between the corners comprised of three equidistant line points.

8. The method as defined in claim 7 wherein the identifying includes identifying a center point of the diagonal.

9. The method as defined in claim 6 wherein the comparing includes testing from at least one of the tests of (a) whether the object has expected dimensions or proportions, (b) whether the corners are right angles, (c) whether a center point matches when calculated from distinct sets of the corners, (d) whether the corners are generally within a common plane, and (e) whether the object lies within an expected viewing range.

10. The method as defined in claim 6 wherein the unprojecting comprises unprojecting a plurality of dimensional representations of the movable real object attributable to three-dimensional movement of the movable real object in the variable viewing area.

* * * * *